Figure 1:
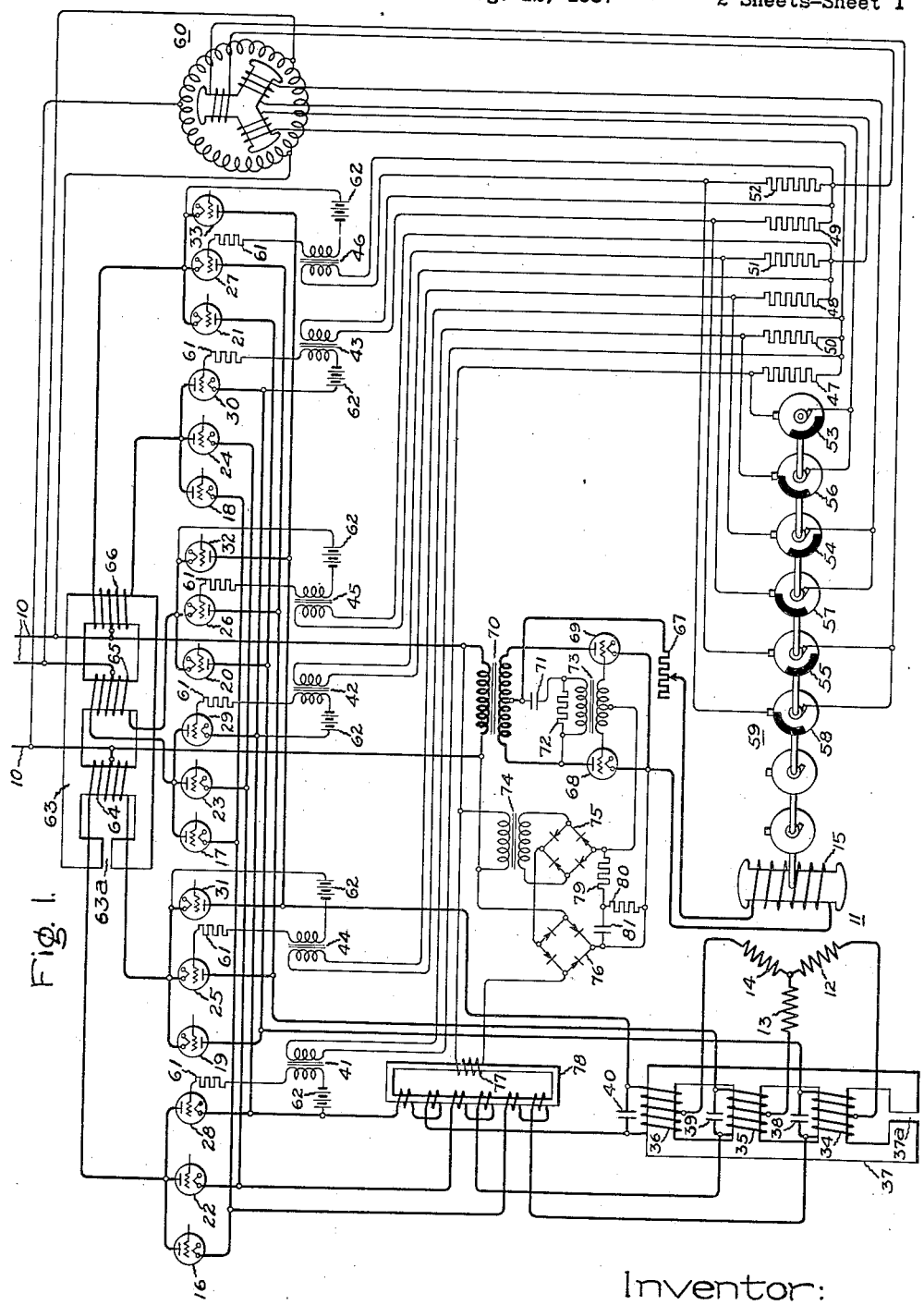

May 28, 1940.　　　　M. M. MORACK　　　　2,202,711
ELECTRIC VALVE CONVERTING SYSTEM
Filed Aug. 12, 1937　　　2 Sheets-Sheet 1

Inventor:
Marvin M. Morack,
by Harry C. Dunham
His Attorney.

Inventor:
Marvin M. Morack,
by Harry E. Dunham
His Attorney.

Patented May 28, 1940

2,202,711

UNITED STATES PATENT OFFICE 2,202,711

ELECTRIC VALVE CONVERTING SYSTEM

Marvin M. Morack, Schenectady, N. Y., assignor to General Electric Company, a corporation of New York Application August 12, 1937, Serial No. 158,693

10 Claims. (Cl. 172—274)

My invention relates to electric valve converting systems adapted to transmit energy between alternating current circuits of the same or different frequencies, and more particularly to such systems operating to supply energy to an electric motor.

Heretofore, there have been proposed numerous arrangements including electric valves for transmitting energy between alternating current circuits of the same or different frequencies. When some of these arrangements are utilized for transmitting energy to an electric motor thereby to control the operating characteristics thereof, it has been common to energize the exciting winding or field of the electric motor from a separate source of direct current. In some instances where the electric motor was provided with two sets of phase windings it has been possible to connect the exciting winding in series relation between the neutral points of these phase windings. In other circuit arrangements, however, where full wave alternating current excitation of the phase windings was obtained, it has not been possible to obtain a series excitation of the exciting winding.

It is, therefore, an object of my invention to provide an improved electric valve converting system for operation with an electric motor which will overcome the above-mentioned disadvantages of the arrangements of the prior art and which will be simple and reliable in operation.

It is another object of my invention to provide an improved electric valve converting system operating with an electric motor in which the phase windings receive full wave alternating current excitation and the exciting winding receives excitation proportional to the current flow through the phase winding.

A further object of my invention is to provide an improved electric valve converting system for transmitting energy between independent alternating current circuits of the same or different frequencies in which means are provided for obtaining a unidirectional current proportional to the energy transmitted between said alternating current circuits.

In accordance with one embodiment of my invention a polyphase alternating current supply circuit is connected to supply variable frequency alternating current to an alternating current circuit such as an alternating current motor, through an electric valve frequency changer. A frequency changer comprises two groups of oppositely connected electric valves interconnecting each phase of the load circuit with the several terminals of the supply circuit. Interposed in the connections between the groups of each pair is an inductive winding provided with an electrical midpoint connected to one phase of the load circuit. The several inductive windings are mounted on a multi-legged magnetic core structure to form a polyphase reactance device so connected in the system that any short circuit current between the several lines of the supply circuit will be opposed by the full magnetizing impedance of the reactance device and thus limited to reducible value. One group of conductors connected to this multi-legged reactance device carries unidirectional current and a saturable reactor is so arranged as to be influenced by this current so as to present a variable reactance to an auxiliary circuit. By means of the auxiliary circuit which controls an auxiliary rectifier supplying energy to the exciting winding of the alternating current motor, it is possible to obtain the operating characteristics of a series type motor.

For a better understanding of my invention together with other and further objects thereof, reference is had to the following description taken in connection with the accompanying drawings, and its scope will be pointed out in the appended claims. Fig. 1 of the accompanying drawings illustrates an arrangement embodying my invention for transmitting energy from a three-phase alternating current supply circuit to a three-phase synchronous dynamo-electric machine arranged to operate with series type characteristics, and Fig. 2 of the accompanying drawings illustrates a different type of frequency changer utilizing my invention for obtaining the necessary series characteristics in a three-phase synchronous dynamo-electric machine.

Referring now to the drawings, there is illustrated an electric valve converting system embodying my invention for transmitting energy from a three-phase alternating current supply circuit 10 to a three-phase alternating current load circuit which is illustrated as a three-phase synchronous dynamo-electric machine 11 adapted to operate at a variable frequency. The synchronous machine 11 comprises phase windings 12, 13 and 14 arranged in star relation with a common neutral, and a rotary field or exciting winding 15. The phase winding 12 is connected to receive energy from the several lines of the supply circuit 10 through a group of electric valves 16, 17 and 18 and to return current to the circuit 10 through a group of valves 19, 20, 21 connected oppositely to the first group of valves. Interposed between the groups of valves 16, 17, 18 and 19, 20, 21 is an inductive winding 34 provided with an electrical midpoint connected to the phase winding 12. Similarly, the phase winding 13 is connected to circuit 10 through the inductive winding 35 and the groups of electric valves 22, 23, 24 and 25, 26, 27 and the phase winding 14 through the inductive winding 36 and the groups of valves 28, 29, 30 and 31, 32, 33. The inductive windings 34, 35, 36 are mounted on three legs of a single multi-legged magnetic core member 37 and comprise a polyphase reactance device. The magnetic core member 37 is preferably provided with a fourth leg having an air gap $37_a$ which is effective to smooth the voltage ripples of the supply circuit from the armature windings of the motor 11. The electric valves 16 to 33, inclusive, are each provided with an anode, a cathode and a control electrode or grid and may be of any of the several types well known in the art although it is preferable to utilize valves having an anode, a cathode, a control or starting electrode arranged within an envelope containing an ionizable medium. In certain instances it may be desirable to connect capacitors 38, 39, 40 in parallel to the inductive windings 34, 35, 36, respectively, to assist in the commutation of current between the several groups of valves connected with the inductive windings, especially in cases where the apparatus is supplying an inductive load. The exciting winding 15 of the synchronous machine 11 may be excited from any suitable source of unidirectional current which varies in accordance with the energy transmitted between the two alternating current circuits.

In order to control the conductivities of the several electric valves that supply current successively to the several phase windings of the synchronous machine 11, the grids or control electrodes of the several groups of electric valves are adapted to be selectively excited, through a distributor 59, with an alternating potential of the frequency of the supply circuit 10. For example, the grids of the group of valves 28, 29, 30 are energized through their respective grid transformers 41, 42, 43, with the potentials across resistors 47, 48, 49, which in turn are energized with an alternating potential of substantially the same phase as that of the supply circuit 10 to which their associated electric valves are connected, through segments 53, 54 and 55, respectively, of the distributor 59, mechanically driven from the synchronous machine 11. Similarly, the grids of the group of valves 25, 26, 27 connected to the phase winding 13 are energized through their respective grid transformers 44, 45, 46 with the potentials across resistors 50, 51, 52, which are similarly energized through the sections 56, 57, 58, of the distributor 59. If desired, some phase shifting arrangement, such for example, as a rotary phase shifting transformer 60 may be interposed between the supply circuit 10 and the several resistors 47 to 52, inclusive, which furnish the source of grid excitation, to control the energy supplied to the machine 11. The grid circuits of each of the groups of valves 28, 29, 30 and 25, 26, 27 may include current limiting resistors 61 and negative bias batteries 62.

For the sake of simplicity there has been shown only the grid circuits for those groups of valves adapted to form one complete current path from the alternating current circuit 10 through the armature winding of the machine 11. However, it will be apparent to those skilled in the art that the control electrodes of the several other electric valves will be excited in a manner similar to that just described.

In order to provide still further protection against short circuit current and to still further extend the periods of conductivity of the several electric valves, an additional reactance device comprising a multi-legged magnetic core member 63 and inductive windings 64, 65 and 66 may be interposed between the alternating current circuit 10 and the several electric valves in a manner similar to that of the reactance device described above. The core member 63 may also be provided with a fourth leg having an air gap $63_a$. In case this reactance device is not desired, it will be understood that each of the lines of the circuit 10 will be connected directly to the two groups of valves to which it is connected to the several windings 64, 65 and 66 as illustrated.

While it is believed that those skilled in the art will readily understand the operation of the above described system, a more complete theory of the operation of the electric valve converting system shown will be found in U. S. Letters Patent No. 1,937,361, granted November 28, 1933, upon the application of Camil A. Sabbah and Marvin M. Morack, and which is assigned to the same assignee as the present application.

In accordance with my invention the field or exciting winding 15 of the alternating current motor 11 is energized by current through an adjustable resistor 67 obtained from an electric valve rectifier comprising a pair of controlled electric valves 68 and 69 and a transformer 70, the primary winding of which is energized from the alternating current circuit 10. Electric valves 68 and 69, which may be any of those types commonly utilized in the art and which comprise an anode, a cathode, a control or starting electrode enclosed in an envelope containing an ionizable medium, are here illustrated as being those of the grid controlled type. The grids of these controlled electric valves are energized by an alternating potential displaced in phase substantially 90° from the anode potential, and a variable direct current bias. The phase displaced alternating current component is obtained from a portion of the secondary winding of the transformer 70 by means of a capacitor 71 and a resistor 72. The alternating current potential appearing across the resistor 72 is impressed across the primary winding of the grid transformer 73, the secondary winding of which is included in the grid circuits of the electric valves 68 and 69. An insulating transformer 74 is connected to be energized from the alternating current circuit 10 and supplies energy to a bridge rectifier 75 the output of which is balanced against a bridge rectifier 76. The difference between the outputs of the bridge rectifiers 75 and 76 determines the amount of the direct current bias impressed upon the grid circuits of the electric valves 68 and 69. The bridge rectifier 76 is energized from the alternating current circuit 10 through a variable reactance device comprising an inductive winding 77 of a saturable reactor 78. The saturable reactor 78 is provided with a plurality of windings each arranged to be connected in one of the conductors leading to the inductive windings 34, 35, 36 of the reactive device 37. The current flowing through these various inductive windings is unidirectional in nature and hence the saturation of the device 78 will vary in accordance with the energy transmitted through reactance device 37. Thus the reactance of the inductive winding 77 varies in accordance with the energy transmitted between the two alternating current circuits one of which comprises the phase windings 12, 13 and 14 of the alternating current motor 11. Thus as the reactance of the winding 77 varies in accordance with the energy transmitted between the alternating current circuits, the output of the bridge rectifier 76 also varies in proportion. This difference of direct current potential between the bridge rectifiers 75 and 76 appears across the resistors 79 and 80 the latter of which is provided with a filter capacitor 81. The output of the rectifying valves 68 and 69 will vary in accordance with the variations in the direct current bias of the grid circuit with the result that the current flowing through the exciting winding 15 is proportional to the alternating current supplied to the phase windings 12, 13 and 14.

Figure 2:
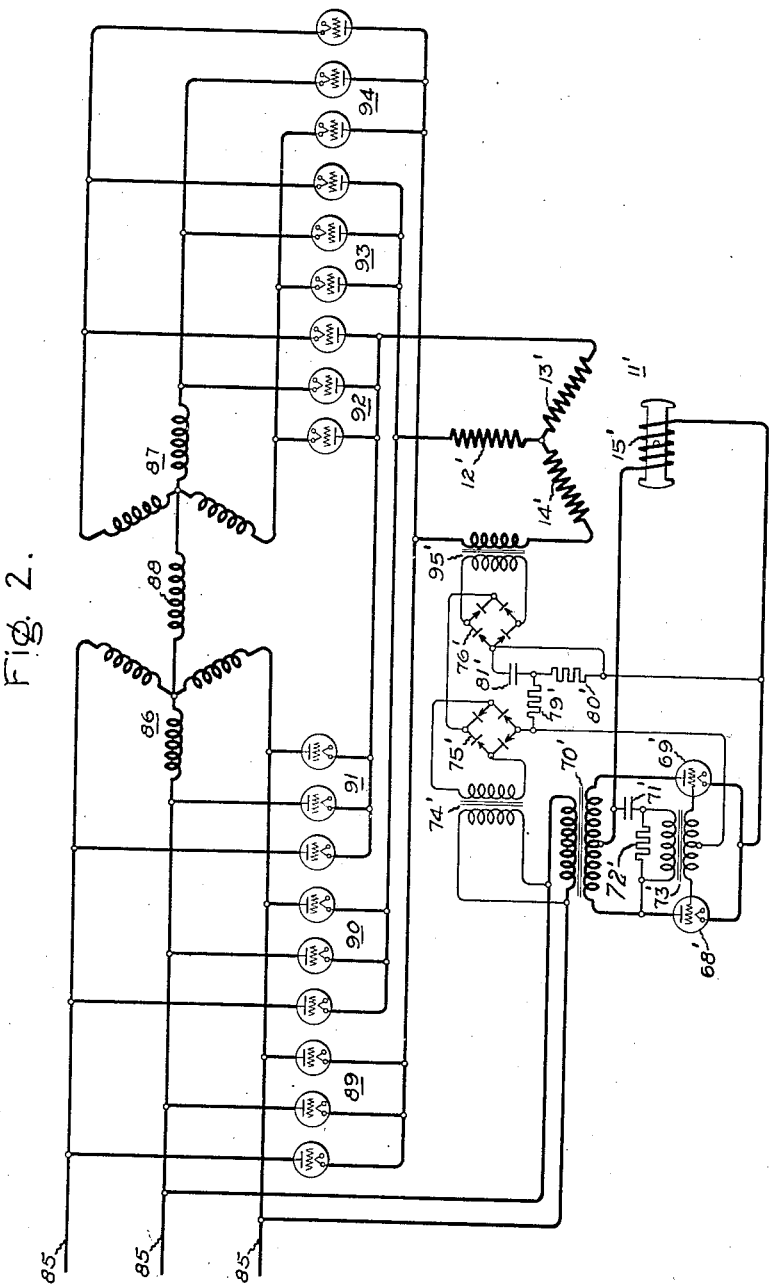

Referring to Fig. 2 there is shown how my invention may be applied to an electric valve converting system of the type shown and described in U. S. Letters Patent No. 1,937,370, granted November 28, 1933, upon the application of Clodius H. Willis and assigned to the same assignee as the present application. In this arrangement the electric valve converting system which is energized from the alternating current circuit 85 utilizes a pair of three phase networks 86 and 87, the electrical neutrals of which are interconnected through an inductive winding 88. A synchronous dynamo-electric machine 11' having phase windings 12', 13', 14' and an exciting winding 15' is arranged to have the various phase windings energized from a plurality of groups of electric valves 89, 90, 91, 92, 93, and 94. These groups of valves may be controlled by means of a circuit similar to that shown in Fig. 1 or a circuit similar to that shown in Patent No. 1,937,370. The exciting winding 15' is energized from a controlled electric valve rectifier comprising a transformer 70' and the electric valves 68' and 69'. The component alternating current potential is supplied to the grid circuits of the electric valves 68' and 69' through the primary winding of the transformer 73' by means of the capacitor 71' and the resistor 72'. The grid circuits of the electric valves 68' and 69' are furthermore controlled in accordance with the variations of a direct current bias obtained from the bridge rectifiers 75' and 76'. The bridge rectifier 75' is energized from the alternating current circuit 85 by means of the insulating transformer 74'. The difference between the outputs of the bridge rectifiers 75' and 76' appears across the resistors 79' and 80' the latter of which is provided a filter capacitor 81'. In one of the conductors which transmit alternating current to the phase windings 12', 13' and 14' there is connected a current transformer 95', the secondary winding of which supplies the necessary potential for the energization of the bridge rectifier 76'. Since the phase windings 12', 13' and 14' each receive the same amount of energy, it is apparent that the potential appearing across the secondary winding of the transformer 95' is a direct indication of the energy transmitted by the electric valve converting system to the phase windings of the synchronous dynamo-electric machine 11. The output of the bridge rectifier 76' therefore is proportional to this energy flow and the result is that the direct current potential appearing in the grid circuits of the electric valves 68' and 69' is proportional to the energy flow through the phase windings 12', 13' and 14' and that the unidirectional current transmitted through the field winding 15' is such as to give series characteristics to the synchronous dynamo-electric machine 11'.

Therefore, in accordance with my invention it is apparent that in the instance where the electric valve converting system has a unidirectional current link it is possible by the means of a saturable reactor to obtain the control of the auxiliary rectifier such that a unidirectional current proportional to the energy transmitted by the electric valve converting system is supplied to the exciting or field winding of the synchronous dynamo-electric machine. Similarly, when full wave alternating current is supplied to the dynamo-electric machine it is possible by means of the circuit arrangement disclosed in Fig. 2 to so control the auxiliary rectifier supplying current to the field winding that the motor has the necessary series characteristics. These particular arrangements have the advantage that standard motors may be used and that there is no need for providing extra field windings or slip rings. Furthermore, such motors may be wound so as to provide the most advantageous voltage and current relations, and also the desired speed torque characteristic may be obtained from the motor.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a variable speed electric motor comprising a plurality of phase windings and an exciting winding and of the type in which the magnetomotive force of said phase windings and the magnetomotive force of said exciting winding are maintained in synchronism during variable speed operation, electric translating apparatus connected between said supply circuit and said phase winding and comprising a plurality of electric valve means for effecting selective energization of said phase windings from said supply circuit, a controlled electric valve rectifier for supplying energy to said exciting winding, and means responsive to the current traversing said phase windings for maintaining continuously the output of said rectifier proportional to the magnitude of the current supplied to said phase windings so as to give said motor direct-current series-motor characteristics.

2. In combination, an alternating current supply circuit, an electric motor of the variable speed type comprising a plurality of phase windings and an exciting winding and in which the magnetomotive force of said phase windings and the magnetomotive force of said exciting winding are maintained in synchronism during variable speed operation, electric translating apparatus connected between said supply circuit and said phase windings and comprising a plurality of electric valve means for effecting selective alternating current energization of said phase windings from said supply circuit at voltages and frequencies differing therefrom, a controlled electric valve rectifier for supplying energy to said exciting winding and comprising a control member, and means for impressing on said control member a voltage which varies in accordance with the current of said phase windings and an opposing voltage which varies in accordance with the voltage of said supply circuit to give said motor series-motor characteristics.

3. The combination of an alternating current circuit and a load circuit, an electric valve converting system interconnecting said source of current and said load circuit for transmitting energy therebetween, means for obtaining a direct current proportional to the energy transmitted to said load circuit comprising an electric valve rectifier including control electrodes energized from said alternating current circuit, and a control circuit for said rectifier including a source of alternating potential and a variable direct current potential, said potentials being applied to the control electrodes of said rectifier valve, and means responsive to the magnitude of the energy transmitted to said load circuit for controlling the variation of said variable direct current potential.

4. The combination comprising a source of alternating current, an alternating current motor comprising an exciting winding and a plurality of phase windings having a common neutral, an electric valve converting system interconnecting said motor and said alternating current circuit for transmitting energy therebetween at different frequencies, an electric valve rectifying means for energizing said exciting winding from said source said electric valve rectifying means including a grid circuit connected so as to be energized with a variable direct current bias and a source of periodic potential, and means responsive to the magnitude of the current flowing through said phase windings for supplying said direct current bias to the grid circuit of the valve rectifying means thereby to obtain energization of said exciting winding proportional to the current flowing through said phase windings.

5. In combination, a source of alternating current, an alternating current motor comprising an exciting winding and a plurality of phase windings having a common neutral, a plurality of groups of similarly connected valves interconnecting said source and each of said phase windings to control the current supplied thereto, means for controlling the conductivity of said valves to control the frequency of the current transmitted thereby, an electric valve rectifying means for energizing said exciting winding from said source, a grid circuit for said electric valve rectifying means connected to a pair of bridge rectifiers which are balanced against each other for supplying a variable direct current bias to the grids of said valve rectifying means, and means responsive to the magnitude of the current flowing through said phase windings for controlling said direct current bias applied to said grid circuit of said electric valve rectifying means.

6. The combination comprising an electric motor provided with a plurality of phase windings and an exciting winding, an alternating current supply circuit, a plurality of groups of electric valves interconnecting said circuit with said phase windings and including a unidirectional current circuit, means for successively rendering conductive said groups of valves to transmit energy from said source to said windings, a controlled electric valve rectifier connected to said source of alternating current for supplying energy to said exciting winding, means continuously responsive to the current transmitted through said unidirectional current circuit by said groups of valves for controlling the magnitude of the current transmitted by said rectifier thereby to produce a current flow through said exciting winding to give said motor series motor characteristics.

7. An electric valve converting system comprising an alternating current supply circuit, a variable frequency alternating current translating apparatus including a plurality of phase windings, a plurality of electric valves interconnecting said phase windings and said circuit, said system including a unidirectional current circuit, means for controlling the conductivity of said valves to control the current transmitted between said alternating current supply circuit and said apparatus, an exciting winding for said apparatus, an electric valve rectifier including control electrodes connected between said alternating current supply circuit and said exciting winding, a control circuit for said rectifier including a source of periodic potential and a variable direct current potential, said potentials being applied to the control electrodes of said rectifier valve, and means responsive to current flowing through said unidirectional current circuit for controlling the variation of said direct current potential.

8. An electric valve converting system comprising a substantially constant frequency alternating current circuit, a variable frequency alternating current translating apparatus including a plurality of phase windings, a plurality of electric valves interconnecting said circuit and said apparatus, said system including a unidirectional current circuit, means for controlling the conductivity of said valves to control the current transmitted between said circuit and said apparatus, an exciting winding for said apparatus, an electric valve rectifier including control electrodes connected between said constant frequency alternating current circuit and said exciting winding, a control circuit for said rectifier including a source of periodic potential and a source of direct current potential, said potentials being applied to the control electrodes of said rectifier valve, and means responsive to the flow of current in the unidirectional current circuit of said first electric valve converting system for controlling the magnitude of the direct current supplied to the control circuit of said rectifier.

9. In an electric valve converting system, the combination of a pair of alternating current circuits of different frequencies, one of said circuits being a three-phase circuit, a pair of oppositely connected groups of electric valves for each phase of said three phase circuit, said valves interconnecting said circuits, means for successively rendering conductive said groups of valves to transmit energy between said circuits and a reactance device comprising a three-legged core member and a winding on each leg, each winding interconnecting a pair of groups of valves and being provided with an electrical midpoint connected to one phase of said three-phase circuit, and means for obtaining a direct current proportional to the total current flow between said alternating current circuits comprising a controlled electric valve rectifier energized from one of said alternating current circuits, and a control circuit for said rectifier including means continuously responsive to the magnitude of the current flowing through the windings of said reactance device for controlling the power output of said rectifier.

10. In an electric valve converting system, the combination of a pair of alternating current circuits of different frequencies, one of said circuits being a polyphase circuit, a plurality of groups of electric valves interconnecting said circuits, means for successively rendering conductive said groups of valves to transmit energy between said circuits, a reactance device comprising a magnetic core member having a plurality of parallel magnetic paths and a winding cooperating with each of said magnetic paths, each of said windings interconnecting two groups of said valves and one phase of said polyphase circuit, and means for obtaining a direct current proportional to the total current flowing between said alternating current circuits comprising an auxiliary controlled electric valve rectifier energized from one of said alternating current circuits, and a control circuit for said rectifier including means continuously responsive to the magnitude of the current flowing through the windings of said reactance device for controlling the output of said rectifier.

MARVIN M. MORACK.